United States Patent
Ellis et al.

(10) Patent No.: US 7,451,511 B2
(45) Date of Patent: Nov. 18, 2008

(54) SHOE SOLE AND METHOD

(75) Inventors: Eugene Ellis, Chesterfield, MO (US); Phillip W. Pugh, University City, MO (US)

(73) Assignee: Brown Shoe Company, Inc., St. Louis, MO (US)

( * ) Notice: Subject to any disclaimer, the term of this patent is extended or adjusted under 35 U.S.C. 154(b) by 533 days.

(21) Appl. No.: 10/544,012

(22) PCT Filed: Feb. 4, 2004

(86) PCT No.: PCT/US2004/002992

§ 371 (c)(1), (2), (4) Date: Aug. 1, 2005

(87) PCT Pub. No.: WO2004/071224

PCT Pub. Date: Aug. 26, 2004

(65) Prior Publication Data
US 2006/0143947 A1     Jul. 6, 2006

Related U.S. Application Data

(60) Provisional application No. 60/445,210, filed on Feb. 5, 2003.

(51) Int. Cl.
*A43C 15/02* (2006.01)
(52) U.S. Cl. .................. 12/146 B; 36/59 R
(58) Field of Classification Search ............... 12/146 B; 36/59 R
See application file for complete search history.

(56) References Cited

U.S. PATENT DOCUMENTS

| 1,811,803 | A | * | 6/1931 | Oakley .................. 36/59 B |
| 2,844,833 | A | | 7/1958 | Odermatt |
| 3,672,077 | A | | 6/1972 | Coles |
| 3,888,026 | A | * | 6/1975 | Dassler .................. 36/25 R |
| 4,519,148 | A | | 5/1985 | Sisco |
| 6,430,844 | B1 | | 8/2002 | Otis |
| 6,571,491 | B2 | | 6/2003 | Safdeye et al. |
| 2003/0009919 | A1 | | 1/2003 | Stein |
| 2004/0020080 | A1 | * | 2/2004 | Cox et al. .................. 36/103 |

* cited by examiner

*Primary Examiner*—Ted Kavanaugh
(74) *Attorney, Agent, or Firm*—Polster,Lieder, Woodruff & Lucchesi, L.C.

(57) ABSTRACT

An outsole (1) for a shoe has a backing member (4) of thermoplastic rubber and on an area of the exterior surface of that backing member an intermediate layer (12) of thermoplastic polyurethane and an outermost layer of fabric (10), the area comprising at least 51 percent of the contact surface of the outsole. In producing the outsole, a sheet of fabric is overlain with a sheet of thermoplastic urethane, the sheet is heated to about the melting point of the TPU to permit the TPU to adhere to the fabric, and the fabric is cooled. The TPU-covered fabric is cut to the size and shape required to fit a backing member, and position in a mold on a bottom surface of a mold, and a quantity of TPR is injected at a temperature lower than the melting point of the TPU but high enough to render the TPU tacky, to insure the inherence of the TPU-covered fabric to the backing, including the resultant outsole.

8 Claims, 2 Drawing Sheets

SHOE SOLE AND METHOD

CROSS-REFERENCE TO RELATED APPLICATIONS

This is the national phase of PCT Application No. PCT/US2004/002992 (WO 2004/071224) under 35 USC 371 and which claims priority to U.S. provisional application 60/445,210 filed Feb. 5, 2003, entitled "SHOE SOLE AND METHOD" all of which are incorporated herein by reference.

TECHNICAL FIELD

The present invention has to do with improvements in an outsole in which a fabric insert is secured, and method of producing it.

BACKGROUND ART

Due to the vagaries of the U.S. tariff schedules, it has become important to produce, import, and sell shoes in which the sole presents a certain percentage, presently at least 51 percent, of fabric that contacts the ground (See U.S. Patent Application Publication No. US-2002-0152638-A1, published Oct. 24, 2002.)

A number of recent patents and patent applications directed to shoes or shoe soles meeting the requirements of the Tariff Schedules for reduced tariffs have issued or been published. The broad idea of a fabric or a felt insert on an outsole is old, see Walters U.S. Pat. No. 3,844,483 (1888). Even a fabric insert with a rubber backing has been patented, see Oakley U.S. Pat. No. 1,811,803 (1931). More recent patents and applications include Otis U.S. Pat. No. 6,430,844 (2002), and Safdeye et al. U.S. Pat. No. 6,571,491 (2003). So far as applicants are aware, the only recent patent application that has acknowledged the real reason for the flurry of activity in this area is U.S. 2002-0152638-A1, published Oct. 24, 2002.

SUMMARY OF THE INVENTION

In accordance with this invention, generally stated, an outsole for a shoe comprises a backing member of thermoplastic rubber (TPR), an area of the exterior surface of the backing member having an intermediate layer of thermoplastic urethane (TPU) and an outermost layer of fabric, the area being of a size that permits classification under the Harmonized Tariff Schedule at a tariff rate lower than that of a shoe having no ground-engaging fabric, presently at least 51 percent of the contact surface of the outsole. The outsole is produced by covering a sheet of fabric, preferably non-woven fabric, with TPU by overlaying the fabric with a sheet of TPU, heating said TPU sheet to about the melting point of the TPU to permit the TPU to adhere to the fabric; cutting the TPU-covered fabric to the size and shape required to fit a backing member to which the covered fabric is to be attached; positioning the cut, covered fabric on a bottom surface of a mold, and injecting into the mold a quantity of TPR at a temperature lower than the melting point of the TPU but high enough to render the TPU tacky, and cooling the resultant outsole. In the preferred embodiment, the side of a non-woven fabric that is to be exposed, i.e. the side opposite the overlain side, is layered with solvent dissolved TPU before the fabric is overlain with the TPU. The layering is done at about 150° Celsius and, preferably, in three passes. Also, preferably, holes are formed in the fabric, through which the TPR is forced to a controlled distance, generally around /1;32".

BRIEF DESCRIPTION OF DRAWINGS

Corresponding reference characters indicate corresponding parts throughout the several views of the drawings.

BEST MODE FOR CARRYING OUT THE INVENTION

Figure 1:
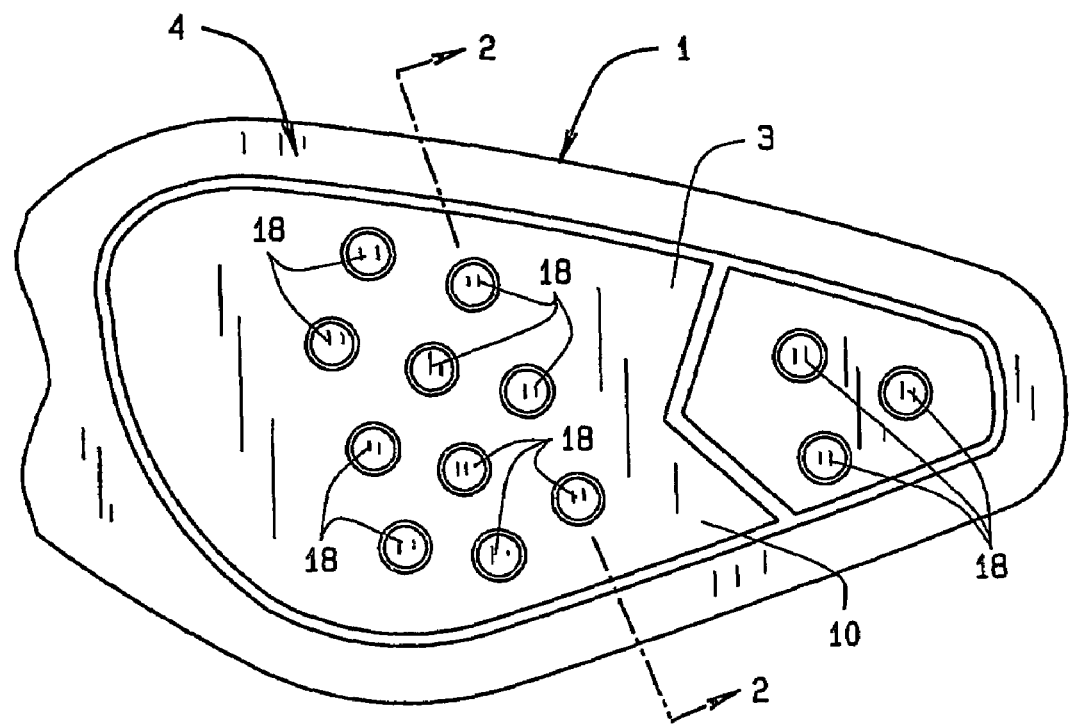
FIG. 1 is a view in plan of the part of an outsole of this invention that contacts the ground.
Figure 2:
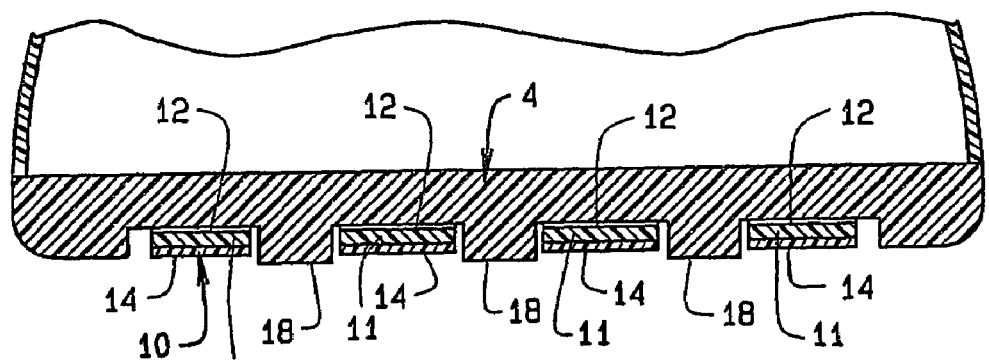
FIG. 2 is a sectional view, taken along the line 2-2 of FIG. 1.
Figure 3:
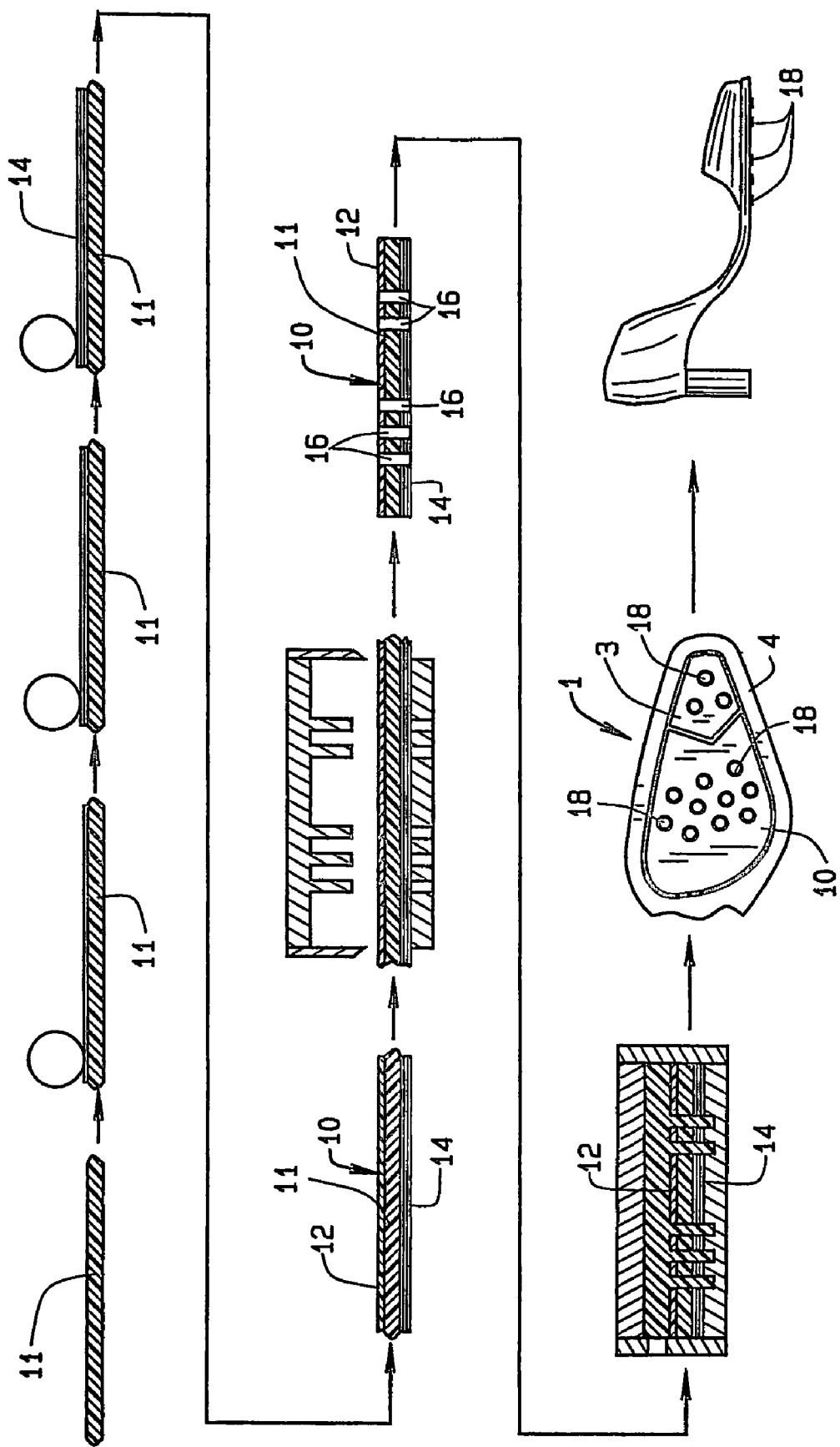
FIG. 3 is a schematic view showing the steps in making the embodiment of sole shown in FIG. 1.

Referring now to the drawing for one illustrative embodiment of outsole of this invention, reference numeral 1 indicates an outsole, made of thermoplastic rubber (TPR), having a ground contacting area 3 of fabric, in this embodiment, non-woven, the area being of a size that permits classification under the Harmonized Tariff Schedule at a tariff rate lower than that of a shoe having no ground-engaging fabric, presently at least 51 percent of the contact surface of the outsole. The area 3 comprises a backing part 4 of the outsole TPR, and a non-woven fabric insert 11 forming an integral part of the outsole. The thickness of the non-woven fabric portion of the insert is generally on the order of 0.8 millimeters, but can vary, depending upon the availability of the fabric and the type of shoe to which the outsole is to be applied. Its exact thickness is not critical. Fabric insert 10 has, on its inner surface, an intermediate layer 12 of thermoplastic polyurethane (TPU) and on its exterior surface, an outermost layer of material 14. In this preferred embodiment, the insert 10 is provided with holes 16, through which the backing part extends to protrude a carefully predetermined distance, on the order of 1/32", to form protruding islands 18 on the outer surface of the fabric insert.

In this, preferred embodiment, the outsole is produced by treating the exterior surface of a sheet of non-woven fabric with a solution of soluble TPU (see, for example Estane®, a product of Noveon) in methyl ethyl ketone (MEK) and dimethyl formamide (DMF), in three passes, at about 150° C. to form a very thin skin 14, on the order of 0.2 mm thick, for example, on the external or contact side of the fabric; covering the inner, opposite side of the treated fabric with TPU by overlaying the fabric with a sheet of TPU, heating the TPU sheet to the about the melting point of the TPU, around 150° C., to permit the TPU to adhere to the fabric; cutting from the TPU-covered fabric, inserts 10 of the size and shape required to fit a backing member to which the covered fabric is to be attached, simultaneously punching holes about 6-8 mm in diameter in a predetermined pattern; scrubbing the surface of the TPU with solvent to promote adhesion; positioning the treated, cut, punched, scrubbed, covered fabric, contact (treated) side down, on a bottom surface of a mold; injecting into the mold a quantity of TPR at a temperature lower than the melting point of the TPU but high enough to render the TPU tacky; cooling the resultant outsole sufficiently to permit its removal from the mold, and removing the outsole from the mold. In the preferred embodiment, the TPR is injected into the mold at a pressure of 18-20 kg, over about three seconds at a temperature in the mold of 74°-79° C., with a dwell time of 2.5 to 3.0 seconds and a pressure in the mold, once injection is complete, of 30-35 kg. In the preferred embodiment, in which holes are punched in the insert, the upper surface of the bottom of the mold has shallow depressions, positioned complementarily to the holes in the insert, to limit the protrusion of the islands and to give them a finished form. Preferably, the mold is Teflon (polytetrafluoroethylene) coated, to facilitate removal of the outsole and to minimize pilling of the fabric.

Numerous variations in the construction of the outsole of this invention and the method of making it, within the scope of the appended claims, will occur to those skilled in the art in the light of the above description. For example, the various dimensions given can and will vary, depending upon the shoes for which the outsole is intended, and manufacturing tolerances. The size of the holes in the insert can be varied, as long as the amount of area the resultant islands cover does not cause the effective fabric area to be less than the percentage required by the tariff schedule. The TPR can be compounded to be somewhat tackier than ordinary TPR at the temperature at which it bonds with the TPU, but not tacky at temperatures to which it is exposed as an outsole of a shoe. The outsole can be made without the holes in the insert or with an entirely different pattern of holes from that shown in the drawing, and can even be made without the coating on the outer surface of the insert, although that coating is much preferred. A heavy woven fabric can be used instead of the non-woven fabric. These variations are merely illustrative.

The invention claimed is:

1. A method of producing an outsole comprising covering a sheet of fabric with TPU by superimposing said fabric and a sheet of TPU, heating said TPU sheet to about the melting point of the TPU to permit the TPU to adhere to the fabric, cooling the TPU covered fabric to harden the TPU; cutting said TPU covered fabric to the size and shape required to fit a backing member to which said covered fabric is to be attached; positioning said cut, covered fabric on a bottom surface of a mold, and injecting into said mold a quantity of TPR at a temperature lower than the melting point of said TPU but high enough to render the TPU tackily adherent, and cooling the resultant outsole.

2. The method of claim 1 wherein the TPR is subjected in the mold to about 30-35 kilograms pressure per square inch.

3. The method of claim 1 wherein the temperature of the TPR in the mold is about 75° C.-79° C. and the dwell time in the mold is about 2.5 to 3.0 seconds.

4. The method of claim 1 including the step, after the coating of TPU on the fabric has hardened, of scrubbing the outer surface of the TPU before the coated fabric is placed in the mold.

5. The method of claim 1 wherein said method provides an area of a ground contacting exterior surface of said backing member of a size that permits classification under the Harmonized Tariff Schedule at a tariff rate lower than a shoe having no fabric contact surface or a fabric ground contact surface that is smaller than that permitting such classification.

6. The method of claim 1 including the step of layering the ground-contacting side of the fabric with a TPU solution at about 150° C.

7. The method of claim 6 wherein the said side is layered in multiple passes to produce a coating about 0.2 mm thick.

8. The method of claim 7 wherein the layering of the fabric is done before the sheet of fabric is covered with a sheet of TPU.

* * * * *